: US006797240B2

United States Patent
Lebl

(10) Patent No.: US 6,797,240 B2
(45) Date of Patent: Sep. 28, 2004

(54) PROCESS AND APPARATUS FOR THE EXTRACTION AND REGENERATION OF ACIDS FROM SPENT ACIDS

(75) Inventor: Albert Lebl, Vienna (AT)

(73) Assignee: Andritz AG, Graz (AT)

( * ) Notice: Subject to any disclaimer, the term of this patent is extended or adjusted under 35 U.S.C. 154(b) by 647 days.

(21) Appl. No.: 09/755,049

(22) Filed: Jan. 8, 2001

(65) Prior Publication Data
US 2002/0031469 A1 Mar. 14, 2002

Related U.S. Application Data

(62) Division of application No. 09/129,212, filed on Aug. 5, 1998, now Pat. No. 6,214,310.

(30) Foreign Application Priority Data

Aug. 6, 1997 (AT) ................................ 1320/97

(51) Int. Cl.[7] .............................. B01J 8/08; B01J 10/00
(52) U.S. Cl. ...................... 422/185; 422/188; 422/198; 422/225; 423/DIG. 1; 423/488; 423/632; 423/633
(58) Field of Search ................................ 422/185, 188, 422/198, 224, 225, 236; 423/DIG. 1, 488, 632, 633

(56) References Cited

U.S. PATENT DOCUMENTS

| 3,275,062 A | 9/1966 | Williams ....................... 159/4 |
| 3,440,009 A | 4/1969 | Flood et al. ................... 23/154 |
| 3,658,483 A | 4/1972 | Lienau et al. ................. 23/263 |
| 4,049,788 A | 9/1977 | Bierbach et al. ............ 423/592 |
| 4,216,196 A | 8/1980 | Hohmann ................... 423/481 |
| 4,261,966 A | 4/1981 | Portes et al. ................ 423/633 |
| 4,889,694 A | 12/1989 | Spink et al. ................ 423/110 |
| 5,149,515 A | 9/1992 | Karner et al. ............... 423/393 |
| 5,401,485 A | 3/1995 | Hamilton, Jr. .............. 423/632 |
| 5,846,510 A | 12/1998 | Hollitt et al. ............... 423/488 |
| 5,939,041 A | 8/1999 | Lebl .......................... 423/488 |
| 5,980,850 A | 11/1999 | Lebl ....................... 423/394.2 |

Primary Examiner—Jerry D. Johnson
Assistant Examiner—Alexa A. Doroshenk
(74) Attorney, Agent, or Firm—Roylance, Abrams, Berdo & Goodman, L.L.P.

(57) ABSTRACT

Process and apparatus for regenerating spent acid liquor includes a primary roasting furnace for evaporating a substantial portion of the liquid from the spent acid to produce acid vapors and partially roasted metal salts. The partially roasted metal salts are transferred to a secondary roasting chamber where the acids adhering to the surface of the metal salts is vaporized and the metal salts are oxidized. The acid vapors from the primary roasting furnace are then transferred to an absorption column to regenerate the acid. The primary roasting furnace is operated at a different temperature from the secondary roasting chamber and has different retention times for the metal salts. The secondary roasting chamber includes a raking device to mix and convey the metal salts during the secondary roasting step to produce a uniformly roasted metal oxide.

31 Claims, 3 Drawing Sheets

_US 6,797,240 B2_

PROCESS AND APPARATUS FOR THE EXTRACTION AND REGENERATION OF ACIDS FROM SPENT ACIDS

This application is a divisional application of Ser. No. 09/129,212, filed Aug. 5, 1998 now U.S. Pat. No. 6,214,310.

FIELD OF THE INVENTION

The present invention is directed to a process and apparatus for the regeneration of acids by pyrolysis of a spent acid liquor solution. More particularly, the invention is directed to a process and apparatus for the roasting of spent acids in a primary roasting furnace followed by a secondary roasting chamber.

BACKGROUND OF THE INVENTION

Pickling acids, such as hydrochloric acid and nitric acid, are used in the treatment of iron and other metals. Typically, the spent acids are regenerated for reuse in various processes to minimize waste and problems associated with disposal.

Several acid regeneration processes pass the spent acid through a furnace to pyrolyze or roast the various components and to produce acid vapors. The vapors are passed through an absorption column counter-currently to an absorption liquid which is typically water. The regenerated acid is then withdrawn through the bottom of the column. The pyrolysis exhaust gases are withdrawn from the head space of the absorption column by an external exhaust fan which is supplied with a water spray to separate particulates remaining in the exhaust gas steam before discharging through a chimney.

Pickling acids of hydrochloric acid used to treat iron or steel produce numerous metal chlorides in the spent acid liquor. Many metal chlorides can be thermally converted into metal oxides and hydrogen chloride. The metal oxides then can be separated from the gaseous hydrogen chloride which can be recovered as hydrochloric acid for regenerating the pickling acids.

Typical processes of regenerating spent acids spray the aqueous acid solution into a heated reactor. The heated reactor heats the acid solution to vaporize the aqueous phase and acid compounds and produce particulates of metal salts that are contained in the spent acids as impurities and waste byproducts. The droplets of the spent acid solution and the particulates of the metal salts fall downwardly through the reactor where the particulates are removed. This process results in vary short retention time in the reactor, usually only a few seconds, which often produces metal oxide particulates having acid residues on the surface of the metal oxide particulates. The acid residues contaminate the metal oxides, thereby requiring further processing before the metal oxides can be used. The reactor temperature can be increased to completely separate the acid residues from the metal oxide particulates. Increasing the reactor temperature often overheats and decomposes a portion of the metal oxide particulates. Furthermore, the acid liquor is usually injected into the middle of the reactor so that the droplets in the middle are insufficiently heated, while the droplets on the outer areas of the reactor are overheated and partially decompose. In addition, increasing the reactor temperature results in a time lag before the desired roasting conditions are attained which can result in large amounts of acid residues being discharged with the metal oxides particulates. Other examples of processes for regenerating acids are disclosed in U.S. Pat. No. 4,049,788 and U.S. Pat. No. 5,149,515.

Accordingly, a continuing need exists in the industry for an improved process for the roasting of spent acid liquors.

SUMMARY OF THE INVENTION

The present invention is directed to a process and apparatus for regenerating spent acids, and particularly pickling acids. More particularly, the invention relates to a process and apparatus for the spray roasting of spent acid liquor using a roasting furnace having a secondary roasting chamber.

Accordingly, a primary object of the invention is to provide a process and apparatus for the complete and uniform roasting of a spent acid liquor and recovering the acid vapors.

Another object of the invention is to provide a process and apparatus for heating a spent acid liquor in a roasting furnace to separate a substantial portion of the acid vapors from the metal salts and transferring the metal salts to a secondary roasting chamber for further roasting of the metal salts.

A further object of the invention is to provide a process and apparatus for the spray roasting of spent pickling acids to produce a metal oxide of substantially uniform composition.

Still another object of the invention is to provide a process and apparatus for roasting a spent acid liquor to evaporate the water from the liquor and a secondary roasting chamber to heat and oxidize the metal salts.

The objects of the invention are basically attained by providing a process for regenerating spent acid liquor, comprising the steps of: feeding a spent acid liquor containing a metal salt into a primary roasting furnace and roasting the liquor to produce an acid vapor and a partially roasted metal salt; discharging the partially roasted metal salt from the roasting furnace to a secondary roasting chamber and completely roasting the metal salts to produce a metal oxide substantially free of acid residues; discharging the acid vapors from the primary roasting furnace and feeding to an absorption column; and feeding an absorption liquid to the absorption column to contact the acid vapors and produce a regenerated acid solution.

The objects of the invention are further attained by providing an apparatus for regenerating spent acid liquor, comprising: a primary roasting furnace having a spent acid liquor inlet, a heating device for heating spent acid liquor to evaporate a liquid portion and produce acid vapors and to produce a partially roasted metal salt, a first outlet for discharging acid vapors, and a second outlet for discharging partially roasted metal salt; a secondary roasting chamber having an inlet for receiving the partially roasted metal salt, a heating device for heating the secondary roasting chamber to a secondary roasting temperature to oxidize the metal salt substantially to a metal oxide and separate acid residues from the metal salt and an outlet for the acid vapors; and an absorption column for receiving acid vapors from the primary roasting furnace, and having an absorption liquid inlet for contacting the acid vapors and forming regenerated acid.

These and other advantages and salient features of the invention will become apparent from the annexed drawings and the detailed description of the invention.

BRIEF DESCRIPTION OF THE DRAWINGS

Referring to the drawings which form a part of the original disclosure in which.

DETAILED DESCRIPTION OF THE INVENTION

The present invention is directed to a process and apparatus for roasting spent acid liquor in the regeneration of acid. More particularly, the invention is directed to a process and apparatus for roasting a spent acid liquor to separate acid vapors and produce a metal oxide having a substantially uniform composition.

The process and apparatus are suitable for large scale acid regeneration plants. The present invention primarily relates to a spray roasting furnace for roasting the spent acids and recovering the acid vapors. In further embodiments, the spent acid liquor can be heated in a fluidized bed reactor. The acid vapors are recovered from the furnace and carried to further processing devices such as scrubbers and absorbers to regenerate the acids. Suitable processing devices for regenerating acids from acid vapors are those generally known in the art of regenerating waste acids. An example of an apparatus for regenerating acid solutions from acid vapors is disclosed in commonly owned U.S. Pat. No. 5,149,515 to Karner which is hereby incorporated by reference in its entirety.

The process and spray roasting apparatus of the invention is particularly suitable for spent acids used in the treatment of various metals. Examples of suitable acids include hydrochloric acid, nitric acid, hydrofluoric acid, sulfuric acid, and mixtures thereof. Suitable spent acids can include spent pickling acids used in the treatment of iron, chromium, nickel, titanium, zirconium, aluminum, and the like. The spent pickling acids typically contain large amounts of metal salts which must be separated or decomposed during the roasting process to regenerate the spent acid efficiently. Typically, the acids are roasted to vaporize the acids and oxidize the metal salts.

Figure 1:
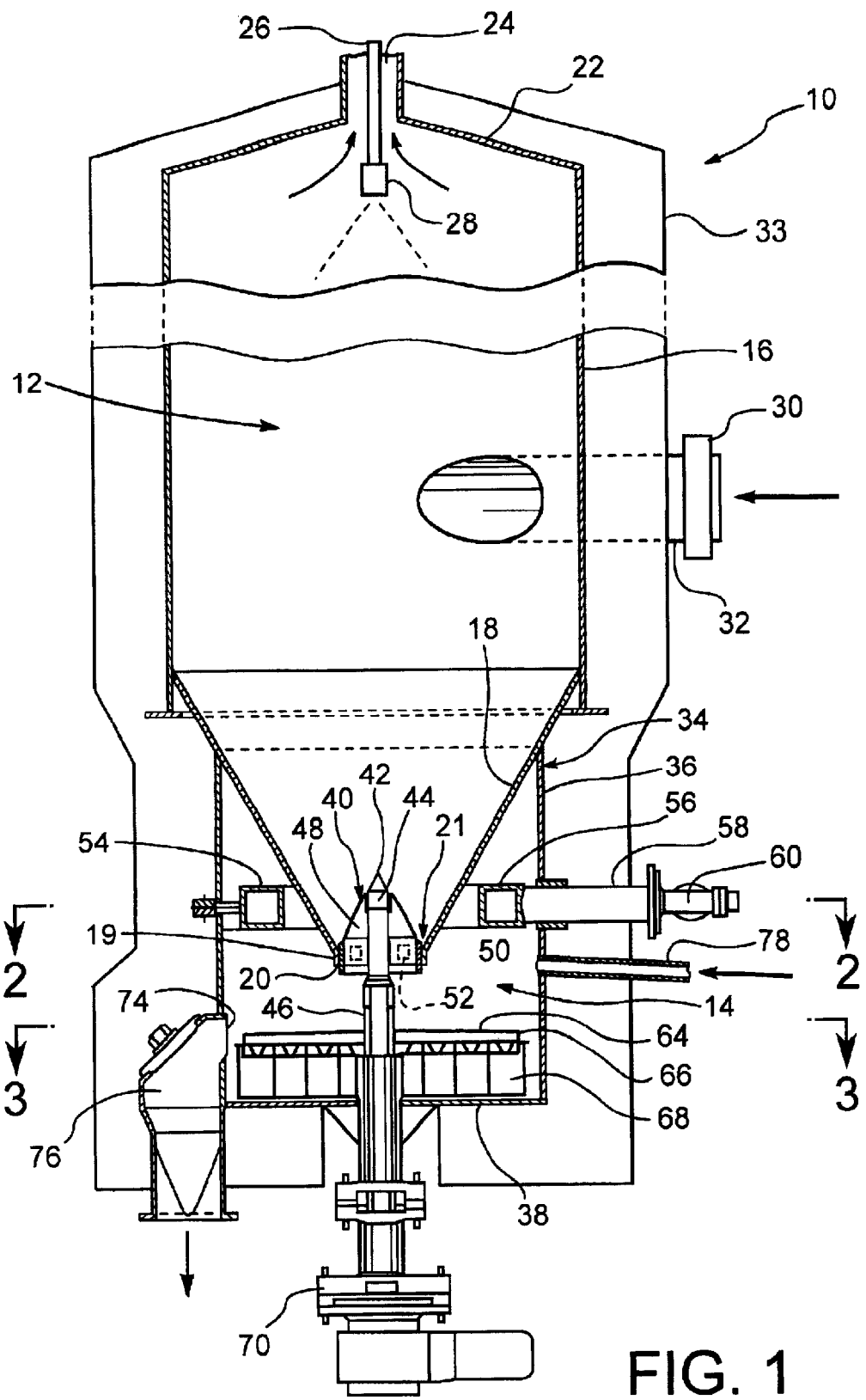
FIG. 1 is a side view in cross-section of the roasting apparatus in a preferred embodiment of the invention.

Referring to FIG. 1, the spray roasting apparatus 10 in a preferred embodiment of the invention includes a primary roasting zone 12 and a secondary roasting zone 14. The spray roasting apparatus 10 includes a substantially circular side wall 16 and a frustoconical bottom wall 18 converging toward the center axis. A discharge opening 20 is provided in the bottom wall 18 and positioned substantially concentric to a vertical axis of the apparatus 10. An annular collar 19 extends downwardly from the bottom wall 18 and surrounds opening 20. The spray roasting apparatus 10 further includes a top wall 22 having an opening 24. In the embodiment illustrated, a pipe 26 extends through opening 24 into the top end of the primary roasting zone 12. A nozzle 28 is attached to the end of pipe 26 for spraying the spent acid solution into the primary roasting zone 12. A burner 30 is connected to a feed pipe 32 for feeding hot combustion gases into the primary combustion zone. An outer support structure 33 surrounds the outer wall 16 of the primary roasting zone 12.

A housing 34 is coupled to the lower end of the spray roasting apparatus 10. Housing 34 includes a substantially cylindrical side wall 36 and a bottom wall 38. Generally, bottom wall 38 is a flat wall substantially perpendicular to side wall 36. In the embodiment illustrated, side wall 36 is coupled to the conical bottom wall 18 of the apparatus 10. Housing 34 encloses and defines the second roasting zone 14 and is positioned directly below the primary roasting zone 12.

As shown in FIG. 1, discharge opening 20 of the conical shaped bottom wall 18 has a substantially annular shape at the apex of the conical bottom wall 18. A cone 40 is positioned in the opening 20 to restrict the size of the opening and restrict the size of particles flowing from the primary roasting zone 12 into the secondary roasting zone 14 as discussed hereinafter in greater detail. Cone 40 includes a solid tip 42 having a collar 44 for coupling with a shaft 46. A frustoconical shaped wall 48 is coupled to the tip 42 and terminates at a substantially cylindrical shaped side wall 50.

Cylindrical side wall 50 is positioned in the discharge opening 20 and is dimensioned to provide a small gap 21 between the side wall 50 and the annular collar 19 and discharge opening 20. In embodiments of the invention, cylindrical side wall 50 includes a plurality of ridges or ribs 52 to assist in breaking the particles into smaller pieces as they pass from the primary roasting zone 12 through the discharge opening 20 into the secondary roasting zone 14. Shaft 46 is coupled to a motor 54 for rotating the cone 40 which feeds the particulate materials from the primary roasting zone 12 into the secondary roasting zone 14 at a substantially uniform and constant rate. The size of the gap 21 between opening 20 in the bottom wall 18 and the side wall 50 of cone 40 is selected to define the particle size of the metal oxides passing into the secondary roasting zone 14. Generally, the particles entering the secondary roasting zone 14 are about 1 to about 300 microns. In preferred embodiments, the gap 21 is sufficiently small to effectively separate the primary roasting zone 12 from the secondary roasting zone 14.

Figure 2:
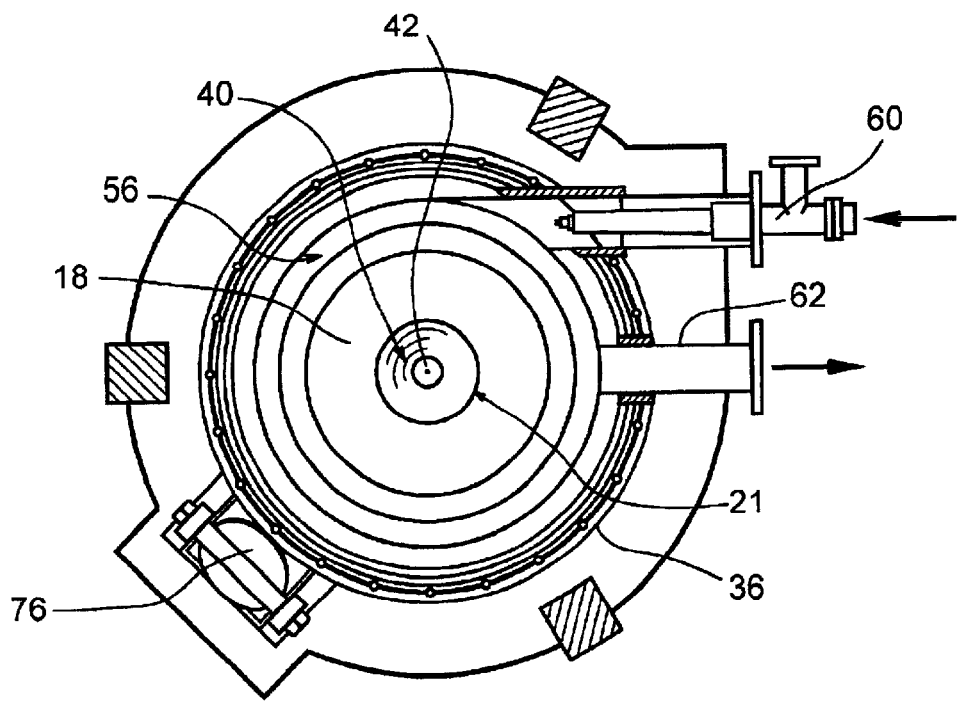
FIG. 2 is a top view in cross-section of the apparatus of FIG. 1 taken along line II—II of FIG. 1.

As shown in FIGS. 1 and 2, a heating device 54 is included in the secondary roasting zone 14. In the embodiment illustrated, heating device 54 is a hollow annular shaped tube 56 having a substantially square cross-section. An inlet pipe 58 is coupled to the heating tube 56 for feeding heated fluid into the tube 56. A burner 60 is positioned in the inlet pipe 58 to burn fuel and combustion air for heating the tube 56. An exhaust outlet 62 is also coupled to the tube 56 for the discharge of the exhaust gases as shown in FIG. 2. In the embodiment illustrated, the combustion gases are fed into the inlet pipe 58 and circulate through the annular shaped heating tube 56 and are discharged through the exhaust outlet 62. Generally, the heating tube is concentric with the discharge opening 20. In further embodiments, heating device 54 can be a radiant tube which can be heated indirectly by suitable processes, such as, for example, superheated steam.

A mixing and conveying device 64 is provided in the bottom end of the secondary roasting zone 14 adjacent bottom wall 38. In preferred embodiments of the invention, the mixing device 64 is a rake, such as a rabble rake, having a support member 66 and a plurality of paddles 68. Support member 66 has a length slightly less than the diameter of the secondary roasting zone 14. A plurality of blades or paddles 68 are fixed to the support member 66 and positioned at an angle with respect to a longitudinal dimension of the support member 66. In the embodiment illustrated, the paddles 68 extend downwardly from the support member 66 and are closely spaced to bottom wall 38. In alternative embodiments, the support member 66 can be positioned proximate bottom wall 38 with the paddles 68 extending upwardly.

Support member 66 is also attached to the shaft 46. Shaft 46 extends through the bottom wall 38 of the housing 34 and is coupled to a drive motor 70 for rotating the shaft 46 about its vertical axis. Rotation of the shaft simultaneously rotates the mixing device 64 and the cone 40. Rotation of the mixing device 64 in the direction of arrows 72 of FIG. 3 continuously mixes and conveys the particulate material from the center axis of the housing 34 toward the outer wall 36. An opening 74 in the side wall 36 of the housing 34 opens to a discharge chute 76. In this manner, rotation of the mixing device conveys the particulate material along the side wall 36 while continuously mixing the particulate material where it is discharged through the discharge chute 76.

In further embodiments of the invention, an inlet pipe 78 extends through the side wall 36 of housing 34 for introducing gases or other materials into the secondary roasting zone 14. In embodiments of the invention, a reducing atmosphere can be introduced into the secondary roasting zone to react with the metal salts in the roasting zone. Examples of suitable reducing gases include hydrogen, water vapor, methane or carbon monoxide, and mixtures thereof. A reducing atmosphere can be maintained in the secondary roasting zone to control the extent of oxidation of the metal salts while driving off the acid residues which may be adhered to the particles.

In the process of the invention, waste acid, such as spent pickling acid, is fed through the pipe 26 and nozzle 28 and sprayed into the primary roasting zone 12. Hot combustion gases from burner 30 are fed through pipe 32 into the primary roasting zone for heating and roasting the spent acid. The droplets of the spent acid fall downwardly through the primary roasting zone 12 where a substantial portion of the water and acid components vaporize. The water vapor and acid vapors are withdrawn through opening 24 and directed to a suitable absorption column where an absorption liquid is contacted with the vapors to produce a regenerated acid. The metal salts in the spent acid are at least partially oxidized in the primary roasting zone 12 as they fall through the hot combustion gases. The extent of oxidation of the metal salts is dependent on the retention time of the metal salts as they fall through the primary roasting zone and the temperature of the combustion gases. The retention time of the droplets and metal salt particles is typically only a few seconds before they reach the bottom of the primary roasting zone. The selected temperature of the primary roasting zone is dependent on the composition of the spent acid and the desired extent of oxidation of the metal salts. In preferred embodiments of the invention, the primary roasting zone is heated to a temperature of about 500° to about 600° C.

The particulates formed in the primary roasting zone 12 which are primarily composed of the metal salts fall downward along the conical bottom wall 18 toward the outlet 20 and the cone 40. The motor 70 and shaft 46 rotate the cone about its axis which break up the oversized particulates into sufficiently small size such that they can pass through the gap 21 between the cylindrical side wall 50 of cone 40 and the edge of the opening 20 of the conical bottom wall 18. A plurality of ribs 52 are provided on the outer face of side wall 50 of cone 40 to assist in reducing the particle size of the metal salts. The metal salts fall downwardly through the gap 21 into the secondary roasting zone 14 and rest on the bottom wall 38 of housing 34.

Figure 3:
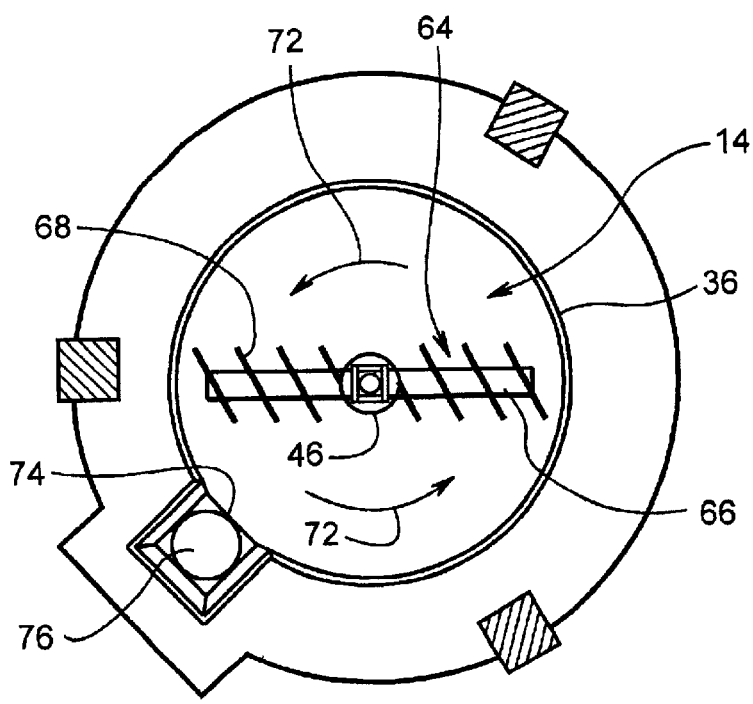
FIG. 3 is a top view in cross-section of the apparatus of FIG. 1 taken along line III—III of FIG. 1.

A fuel and air mixture is fed to the burner 60 which heats the heating tube 56 to heat the secondary roasting zone to a desired temperature. Mixing device 64 being connected to the shaft 46 rotates simultaneously with the rotation of cone 40 to continuously mix the particles in the secondary roasting zone 14. Continuous mixing of the particles by the mixing device 64 continuously exposes fresh surfaces of the particulates to ensure proper and uniform roasting and a uniform composition of the resulting metal oxides. As shown in FIG. 3, rotation of the mixing device 64 conveys the particulates toward the outer wall 46 of the housing 34 toward the discharge outlet 76. Continuous rotation of the mixing device provides substantially uniform mixing and substantially uniform retention times for the particulates in the secondary roasting zone.

The temperature of the secondary roasting zone can be selected depending on the nature of the metal salts and the desired extent of roasting and is typically different from the temperature in the primary roasting chamber. In one embodiment of the invention, the secondary roasting zone is carried out at a temperature of approximately 400–500° C. The secondary roasting temperature in this range is particularly suitable for producing oxides having high specific surface areas and also for producing gamma iron. In further embodiments of the invention, the secondary roasting zone can be carried out at a temperature of about 800–1000° C. The secondary roasting at the higher temperatures is particularly suitable for roasting metal chlorides to produce metal oxides that are substantially free of acid residues. In still further embodiments, the reducing atmosphere can be fed into the secondary roasting zone through the inlet pipe 78. Examples of reducing gases include hydrogen, water vapor, methane, carbon monoxide, and mixtures thereof. The operating temperature of the secondary roasting zone 14 is independent of the operating temperature of the primary roasting zone 12. Typically, the secondary roasting zone is operated at a temperature to drive off the remaining acid residues of the particles and completely oxidize the metal salts without decomposing the oxides.

The process and apparatus of the invention are particularly suitable for vaporizing the acid components of spent acid that are conveyed to a regeneration column and for producing metal oxides having a substantially uniform composition. In embodiments of the invention, the primary roasting zone is operated at a lower temperature than conventional roasting zones to prevent overheating and decomposition of the metal oxides formed in the primary roasting zone. The operating temperatures in the primary roasting zone and the retention time of the spent acid is sufficient to vaporize substantially all of the water and acid components from the spent acid liquor. The particulate metal salts formed in the primary roasting zone are at least partially oxidized and typically contain some acid residues adhering to the surfaces of the particles. The retention time of the spent acid in the primary roasting zone is generally a few seconds.

The partially oxidized metal salts are then passed into the secondary roasting zone where the particles are heated at a temperature independent of the operating temperature of the primary roasting zone. The continuous mixing and conveying of the particulates in the secondary roasting zone ensure that the metal salts are uniformly heated to drive off the remaining acid residues which are then discharged to the atmosphere or further processing facility. The speed of rotation of the shaft 46 and the mixing device 64 determine the retention time of the metal salts in the secondary roasting zone and is independent of the retention time of the spent acids in the primary roasting zone. The retention time of the metal salts in the secondary roasting zone is typically longer than the retention time in the primary roasting zone and can be about 3–5 minutes depending on the nature of the metal salts being roasted. The actual retention time in the secondary roasting zone is generally several minutes. In embodiments, the metal salts being heated in the secondary roasting zone can have a retention time of 10 to about 20 minutes to ensure complete oxidation of the metal salts and complete removal of the acid residues.

Figure 4:
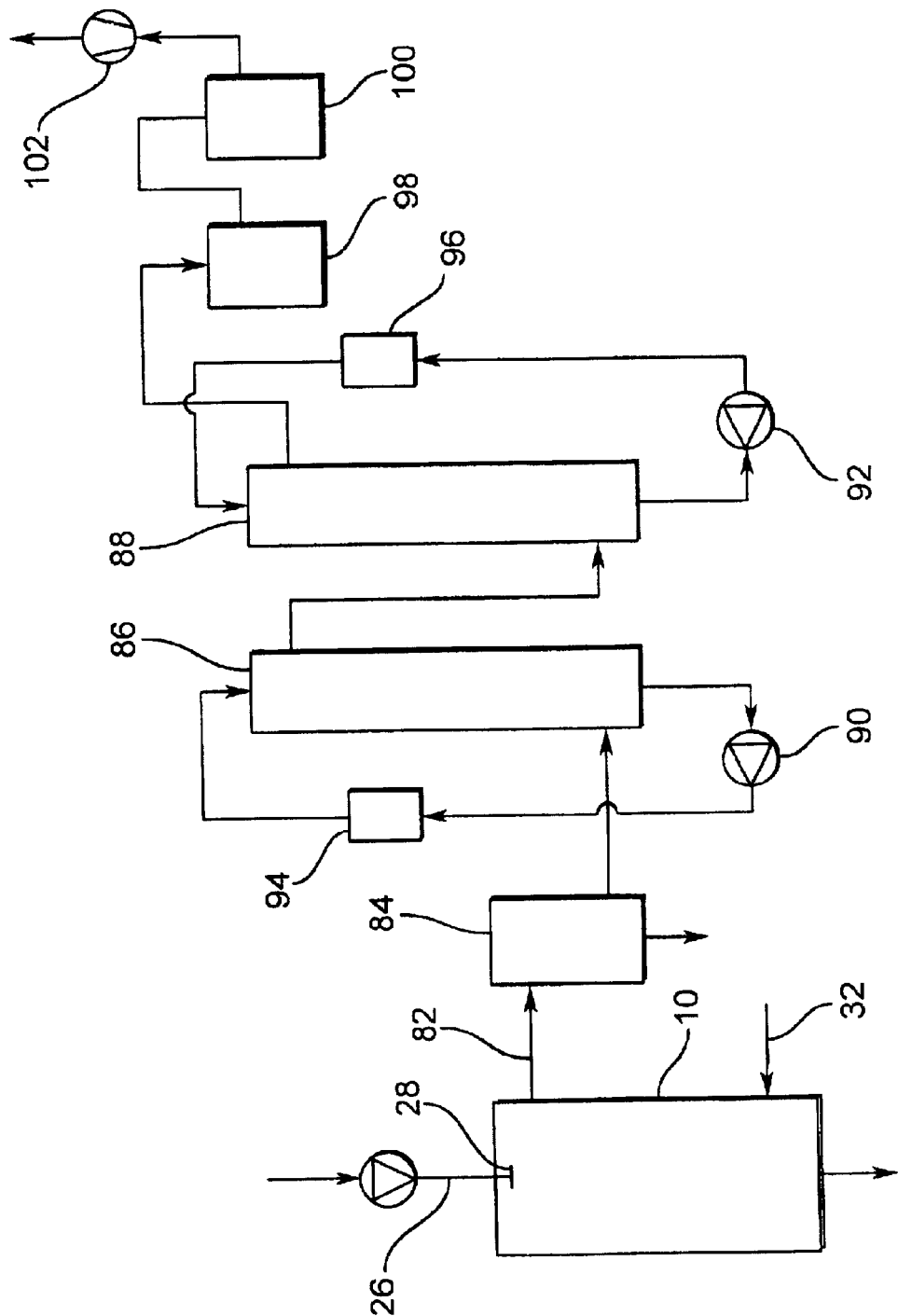
FIG. 4 is a schematic diagram of an acid regeneration apparatus.

FIG. 4 is a schematic diagram of the acid regeneration assembly of the invention. The assembly includes the spray roasting apparatus 10 having the inlet pipe 26 and spray nozzle 28. The combustion gases are fed through pipe 32 to pyrolyze the spent acids. Acid vapors are removed through line 82 to a dust separator 84. The gases then enter at least one and generally two absorption towers 86 and 88 having an absorption liquid therein. The acid in the bottom of towers 86 and 88 are withdrawn by pumps 90 and 92 and passed through heat exchangers 94 and 96 where the acid liquid is fed to the top portions of the towers 86 and 88. The exhaust gases are then passed from tower 88 through scrubbers 98 and 100 and eventually through a fan 102 for discharging the exhaust to the atmosphere.

While several embodiments have been shown to illustrate the invention, it will be understood by those skilled in the art that various modifications and changes can be made therein without departing from the scope of the invention as defined in the following claims.

What is claimed is:

1. An apparatus for use in regenerating spent acid liquor, comprising:
   a primary roasting furnace having a spent acid liquor inlet, a heating device for heating spent acid liquor in said primary roasting furnace to a temperature to evaporate a liquid portion and to produce acid vapors and a partially roasted metal salt, said primary roasting furnace further having a first outlet for discharging acid vapors, and a second outlet for discharging partially roasted metal salt; and
   a secondary roasting chamber having an inlet for receiving said partially roasted metal salt, a heating device for heating said secondary roasting chamber to a secondary roasting temperature sufficient to oxidize said metal salt substantially to a metal oxide and to separate acid residues from said metal salt, and having an outlet for said acid vapors and metal oxide.

2. The apparatus of claim 1, further comprising a member for partially closing said second outlet in said primary roasting furnace to define an evaporation zone in said primary roasting furnace that is separate from a secondary roasting zone in said secondary roasting chamber.

3. The apparatus of claim 1, wherein said heating device for said secondary roasting chamber includes a hollow ring and a burner device for passing hot combustion gases through said ring.

4. The apparatus of claim 3, wherein said ring is substantially concentric with said second outlet in said primary roasting furnace.

5. The apparatus of claim 1, wherein said primary roasting furnace is a spray roasting furnace.

6. The apparatus of claim 1, wherein said secondary roasting chamber comprises an outlet, a rake and a motor drive device for moving said rake to mix and convey metal salt toward said outlet in said secondary roasting chamber.

7. The apparatus of claim 6, wherein said rake comprises a support member with a longitudinal dimension and having a plurality of blades fixed to said support member at an angle with respect to said longitudinal dimension, and said motor drive device is coupled to said support member for rotating said rake about a central axis with respect to said secondary heating chamber to mix and convey metal salt from said center axis toward said outlet in said secondary roasting chamber.

8. The apparatus of claim 6, wherein said rake is a rabble rake.

9. The apparatus of claim 1, wherein said secondary roasting chamber comprises an inlet for feeding reducing gas into said secondary roasting chamber.

10. The apparatus of claim 9, wherein said reducing gas is selected from the group consisting of hydrogen, water vapor, methane, carbon monoxide, and mixtures thereof.

11. The apparatus of claim 1, wherein said primary roasting furnace includes a frustoconical bottom wall and wherein said second outlet is at an apex of said bottom wall.

12. The apparatus of claim 11, further comprising a rotatable cone member positioned in said second outlet of said primary roasting furnace defining an annular gap for reducing a particle size of partially roasted metal salt discharged to said secondary roasting chamber.

13. The apparatus of claim 12, wherein said bottom wall of said primary roasting furnace includes an annular wall surrounding said second outlet and wherein said cone member includes a cylindrical side wall cooperating with said annular wall.

14. The apparatus of claim 1, wherein said heating device of said primary roasting furnace feeds hot gases tangentially into said primary roasting furnace.

15. A spray roasting apparatus for use in regenerating spent acid liquor, said spray roasting apparatus comprising:
    a primary roasting furnace having a liquid spray inlet for spraying spent acid liquor into said primary roasting furnace, a heating device coupled to said furnace for heating spent acid liquor to a temperature sufficient to evaporate a liquid portion and produce acid vapors and to produce a partially roasted metal salt, a first outlet for discharging acid vapors, and a second outlet for discharging partially roasted metal salt; and
    a secondary roasting chamber coupled to said primary roasting furnace and having an inlet dimensioned for receiving partially roasted metal salt from said second outlet of said primary roasting furnace, a second heating device for heating said secondary roasting chamber to a secondary roasting temperature sufficient to oxidize a metal salt substantially to a metal oxide and to separate acid residues from the metal salt, and an outlet dimensioned for discharging acid vapors, and for discharging metal oxide from said secondary roasting chamber.

16. The apparatus of claim 15, further comprising a closure member positioned in and partially closing said second outlet in said primary roasting furnace to define an evaporation zone in said primary roasting furnace and a secondary roasting zone in said secondary roasting chamber.

17. The apparatus of claim 15, wherein said second heating device for said secondary roasting chamber includes a hollow annular ring and a burner device coupled to said ring for directing hot combustion gases through said ring.

18. The apparatus of claim 17, wherein said ring is substantially concentric with said second outlet in said primary roasting furnace and said inlet in said secondary roasting chamber.

19. The apparatus of claim 15, wherein said secondary roasting chamber comprises a rake and a motor drive device for moving said rake to mix and convey metal salt in said secondary roasting chamber to said outlet of said secondary roasting chamber.

20. The apparatus of claim 19, wherein said rake comprises a support member with a longitudinal dimension and having a plurality of blades fixed to said support member at an angle with respect to said longitudinal dimension, and said motor drive device is coupled to said support member for rotating said rake about a central axis with respect to said secondary heating chamber to mix and convey metal salt from said center axis toward said outlet in said secondary roasting chamber.

21. The apparatus of claim 19, wherein said rake is a rabble rake.

22. The apparatus of claim 15, wherein said secondary roasting chamber comprises a reducing gas supply and a gas inlet for feeding said reducing gas into said secondary roasting chamber.

23. A spray roasting reactor comprising:
- a reactor housing defining a primary roasting zone and having a liquid inlet for feeding a liquid into said primary roasting zone, a heating device for heating said primary roasting zone to a temperature for roasting spent acid liquor, and a bottom wall with a discharge opening;
- a rotatable cone member positioned in said discharge opening, said cone member having a substantially frustoconical portion positioned adjacent said opening to define an annular gap therebetween;
- a drive device for rotating said cone member whereby said cone member reduces the size of particulates produced during roasting of the spent acid while passing between said cone member and said opening of said bottom wall; and
- a secondary roasting chamber separated from said primary roasting zone by said rotatable cone member.

24. The reactor of claim 23, wherein said cone member includes a cylindrical side wall having a plurality of ribs for reducing the size of particles passing between said cone and opening in said bottom wall.

25. The reactor of claim 24, wherein said bottom wall of said primary roasting zone has a frustoconical shape converging to said discharge opening.

26. The reactor of claim 23, wherein said reactor housing includes an annular collar extending axially from said discharge opening cooperating with said cylindrical side wall of said cone member.

27. The reactor of claim 23, wherein said liquid inlet is a spray nozzle.

28. The reactor of claim 23, further comprising a rotating rake for mixing particulates in said secondary roasting chamber and conveying said particulates to a discharge opening, wherein said rake is coupled to said drive device for rotating simultaneously with said cone member.

29. The reactor of claim 23, further comprising an annular wall extending from said bottom wall of said reactor housing and surrounding said discharge opening, said annular wall enclosing said secondary roasting chamber.

30. The reactor of claim 29, further comprising a hollow, annular heating member in said secondary roasting chamber surrounding said discharge opening in said bottom wall of said reactor housing.

31. The reactor of claim 30, wherein said annular heating member is above said discharge opening in said bottom wall of said reactor housing.

* * * * *